United States Patent
Larson et al.

(10) Patent No.: US 6,680,766 B1
(45) Date of Patent: *Jan. 20, 2004

(54) LIQUID CRYSTAL DISPLAY WHEREIN TWIST ANGLE OF LIQUID CRYSTAL MATERIAL DIFFER FROM 90° BY APPROXIMATELY 15° OR MORE

(75) Inventors: Brent D. Larson, Cave Creek, AZ (US); Elias S. Haim, Glendale, AZ (US); Kalluri R. Sarma, Mesa, AZ (US); Syed H. Jamal, Phoenix, AZ (US)

(73) Assignee: Honeywell Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 584 days.

(21) Appl. No.: 09/223,845

(22) Filed: Dec. 31, 1998

(51) Int. Cl.$^7$ ............ G02F 1/1335; G02F 1/1337
(52) U.S. Cl. ............ 349/121; 349/117; 349/119; 349/123; 349/129
(58) Field of Search .............. 349/117, 129, 349/119, 121, 128, 126, 123

(56) References Cited

U.S. PATENT DOCUMENTS

| | | | |
|---|---|---|---|
| 5,150,235 A | | 9/1992 | Haim et al. |
| 5,196,953 A | | 3/1993 | Yeh et al. |
| 5,227,903 A | | 7/1993 | Miyazawa et al. |
| 5,237,438 A | | 8/1993 | Miyashita et al. |
| 5,291,323 A | | 3/1994 | Ohnishi et al. |
| 5,689,322 A | * | 11/1997 | Hirata et al. ............. 349/180 |
| 5,737,048 A | * | 4/1998 | Abileah et al. ........... 349/121 |
| 5,777,709 A | * | 7/1998 | Xu ........................... 349/120 |
| 5,859,681 A | * | 1/1999 | VanderPloeg et al. .... 349/120 |
| 5,895,106 A | * | 4/1999 | VanderPloeg et al. .... 349/120 |
| 6,141,070 A | * | 10/2000 | Kaneko ..................... 349/117 |
| 6,181,401 B1 | * | 1/2001 | Penn ......................... 349/129 |

FOREIGN PATENT DOCUMENTS

EP 0 622 656 A1 4/1994

OTHER PUBLICATIONS

S. Palmer, "Liquid crystal cell with a wide viewing angle and a high cell contrast", 1997, Applied–Optics (USA), vol. 36, No. 10, p. 2094–100.*

* cited by examiner

Primary Examiner—Tarifur R. Chowdhury

(57) ABSTRACT

A display according to various aspects of the present invention comprises an LCD having a first substrate, a second substrate proximate the first substrate, a liquid crystal material located between the first and second substrates, an element for compensating for horizontal view angle limitations of the display. The LCD may further include a non-mechanical element for vertically shifting the viewing angle associated with the high-contrast viewing envelope of the LCD device.

28 Claims, 14 Drawing Sheets

Normally White cell                                      6/19/95 test
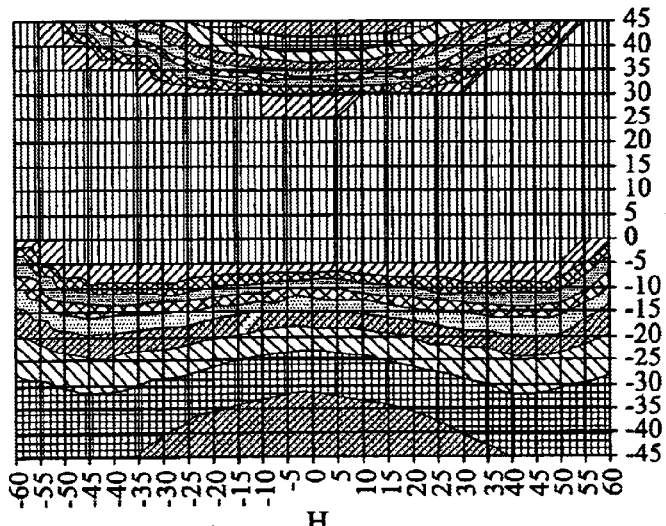
Fig. 7A
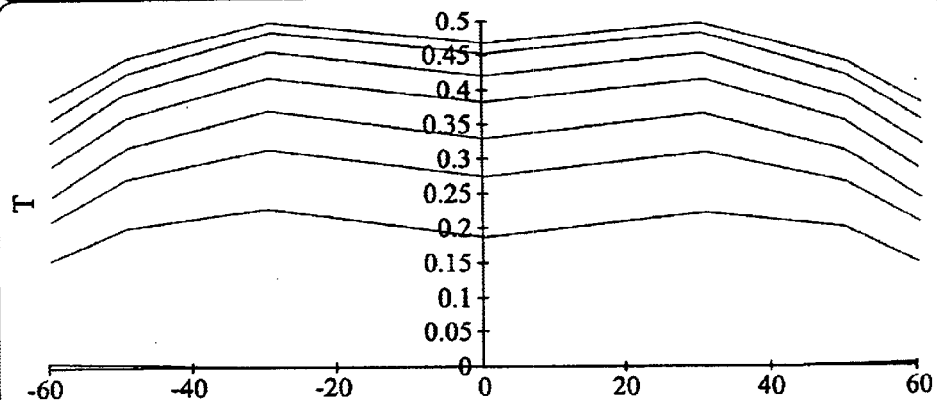
Fig. 7B        At Vertical Angle of 0 degrees
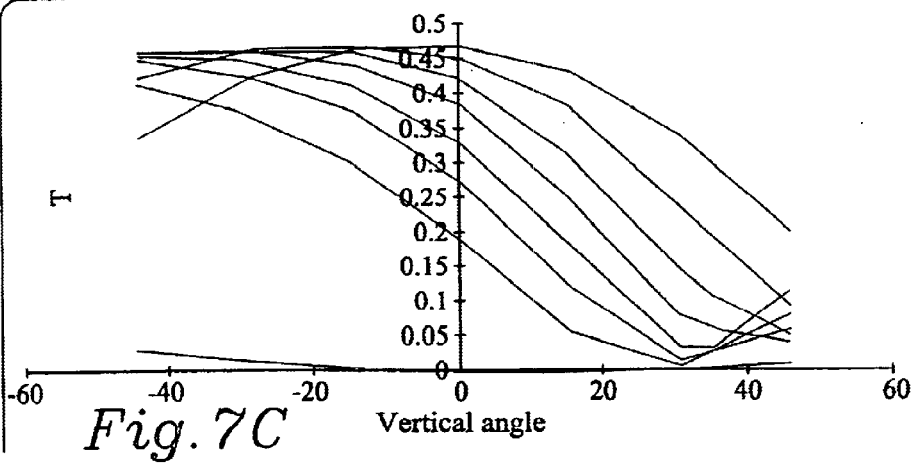
Fig. 7C        At Horiz. Angle of 0 degrees At Vertical Angle of 0 degrees At Horiz. Angle of 0 degrees

LIQUID CRYSTAL DISPLAY WHEREIN TWIST ANGLE OF LIQUID CRYSTAL MATERIAL DIFFER FROM 90° BY APPROXIMATELY 15° OR MORE

BACKGROUND OF THE INVENTION

1. Field of the Invention

The present invention relates generally to liquid crystal displays and, more particularly, to a liquid crystal display having a customizable viewing envelope.

2. Description of the Related Art

Liquid crystal displays (LCDs) may be utilized in a variety of applications such as notebook computers, hand-held calculators, and wristwatches. LCDs are also used in many applications having relatively high optical performance specifications, e.g., precision instrumentation utilized in avionics. Different applications may have different optical performance requirements, such as minimum contrast ratio characteristics over a range of horizontal and/or vertical viewing angles. Although several prior art LCDs address the needs of individual applications, such solutions are typically expensive to implement and/or limited to a narrow field of use.

Figure 1:
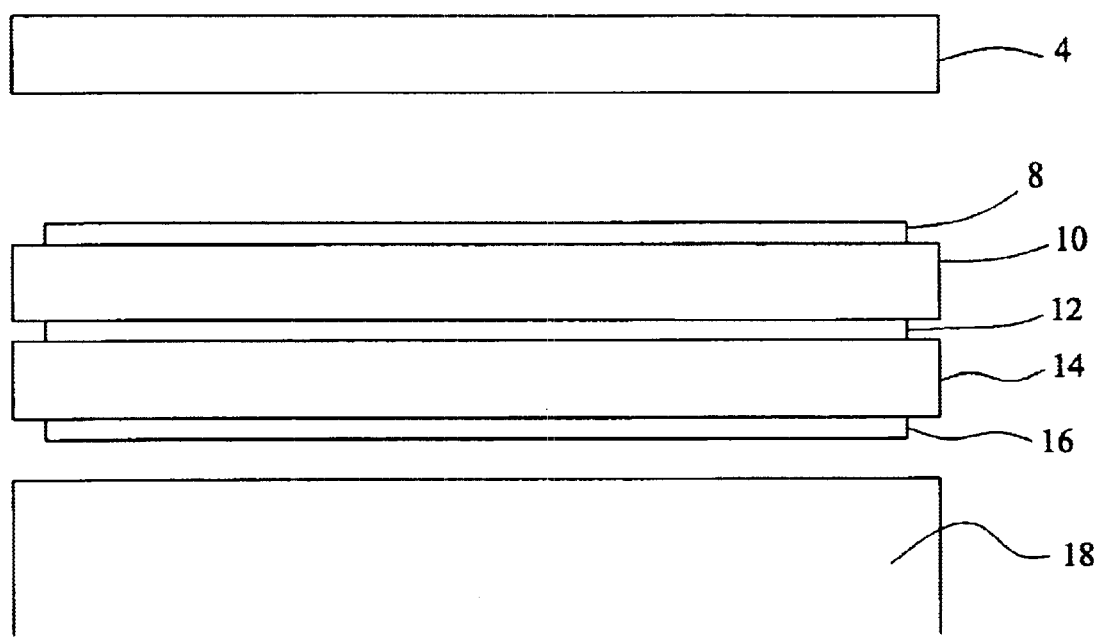

For example, referring to FIG. 1, a conventional polarized display 2 includes a front polarizer 8, a first substrate 11, a liquid crystal layer 12, a second substrate 14, and a rear polarizer 16 sandwiched between a cover glass 4 and a backlight 18. Each of the substrates 11, 14 suitably includes an alignment layer on the surface facing the liquid crystal 12 which is rubbed in a selected direction to facilitate the alignment of the liquid crystal molecules. Typically, the alignment layers are rubbed in directions that are at right angles to each other, for example at 135 degrees from a horizontal axis of the display on the first substrate 11 and at −135 degrees from the horizontal axis on the second substrate 14.

Light from the backlight 18 is initially polarized along a polarization axis of the rear polarizer 16, and electrical fields applied to portions of the liquid crystal cause the liquid crystal to either alter or preserve the polarization of light passing through the liquid crystal. Only light polarized along the polarization axis of the front polarizer 8 is transmitted.

The viewing envelope of a conventional display is typically limited. For example, referring to FIGS. 2A–C, the viewing envelope in both the horizontal and vertical directions deteriorates rapidly as the viewing angle deviates from the perpendicular. Consequently, the display is unsuitable for applications requiring an extended vertical or horizontal viewing envelope.

Figure 3A:
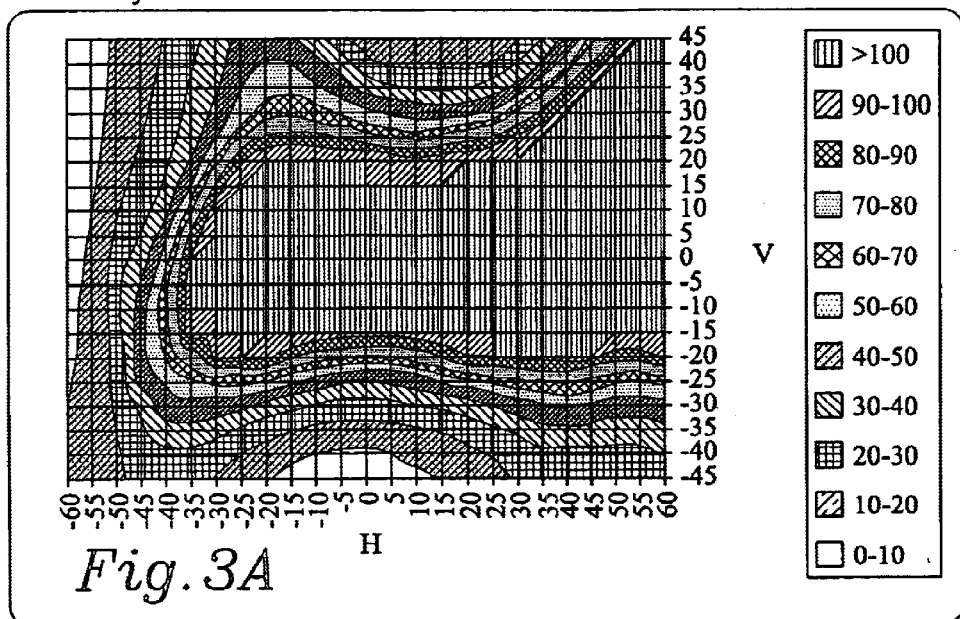
Figure 3B:
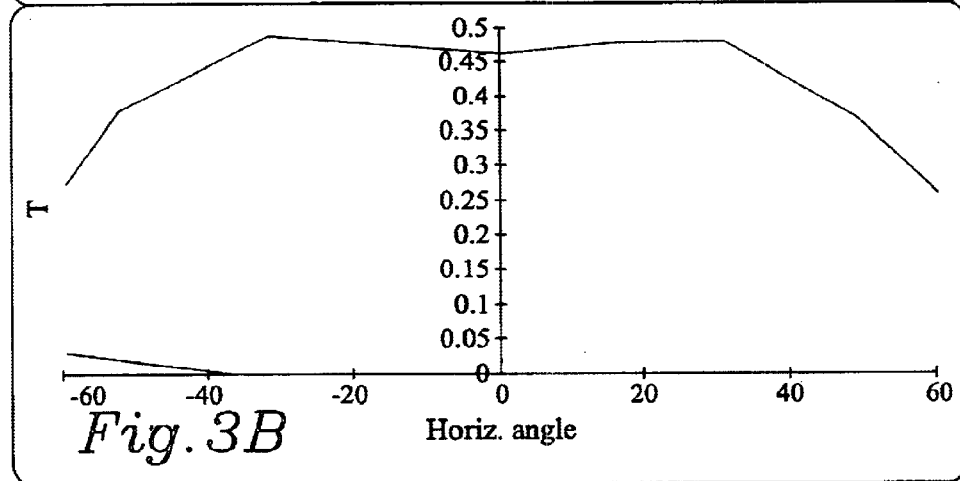
Figure 3C:
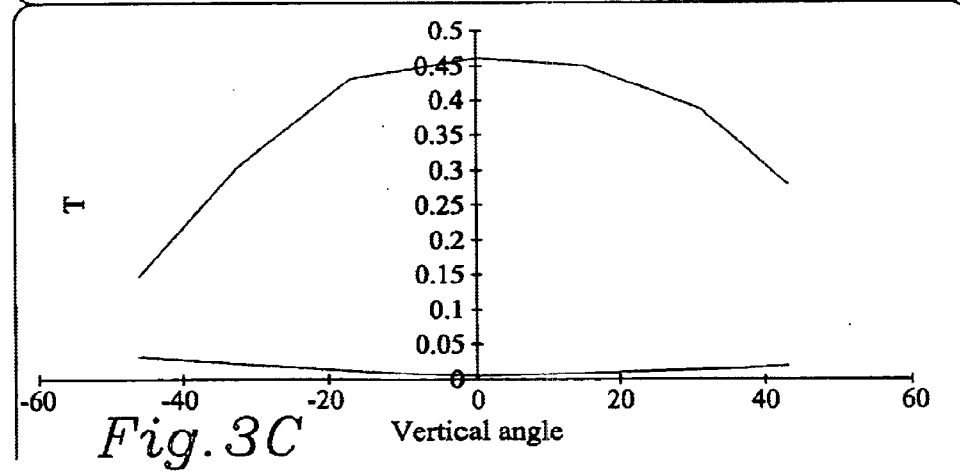

For applications requiring high contrast at angles other than the perpendicular, some displays include a negative birefringence retarder in the optical path of the display. The retarder tends to horizontally shift the viewing envelope, as shown in FIGS. 3A–C. Although the contrast on one side of the display improves, the contrast on the other side diminishes. In addition, the retarder tends to adversely affect the vertical viewing envelope.

Many applications, such as cockpit instrumentation, require relatively wide horizontal viewing angles and high contrast ratios. For example, the horizontal range requirements for some LCDs may be up to±60 degrees. Other applications may require expanded vertical viewing envelopes or selected vertical viewing angles which cannot be adequately accommodated by conventional displays. For example, if an LCD is mounted in a predetermined position within an instrument panel, a vertical viewing angle range may be determined from the anticipated line of sight of the pilot and/or co-pilot. To facilitate acceptable display contrast for different vertical viewing angles, some prior art solutions utilize physically adjustable LCDs or instrument panels mounted with a swivel element. Such movable displays, however, are associated with many problems, including wear on moving parts, spatial requirements, and mounting.

SUMMARY OF THE INVENTION

A display according to various aspects of the present invention comprises an LCD having a first substrate, a second substrate proximate the first substrate, a liquid crystal material located between the first and second substrates, an element for compensating for horizontal view angle limitations of the display. The LCD may further include a nonmechanical element for vertically shifting the viewing angle associated with the high-contrast viewing envelope of the LCD device.

BRIEF DESCRIPTION OF THE DRAWING FIGURES

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which like parts may be referred to by like numerals:

FIG. 1 is a cross section of a conventional LCD.

Figure 2A:
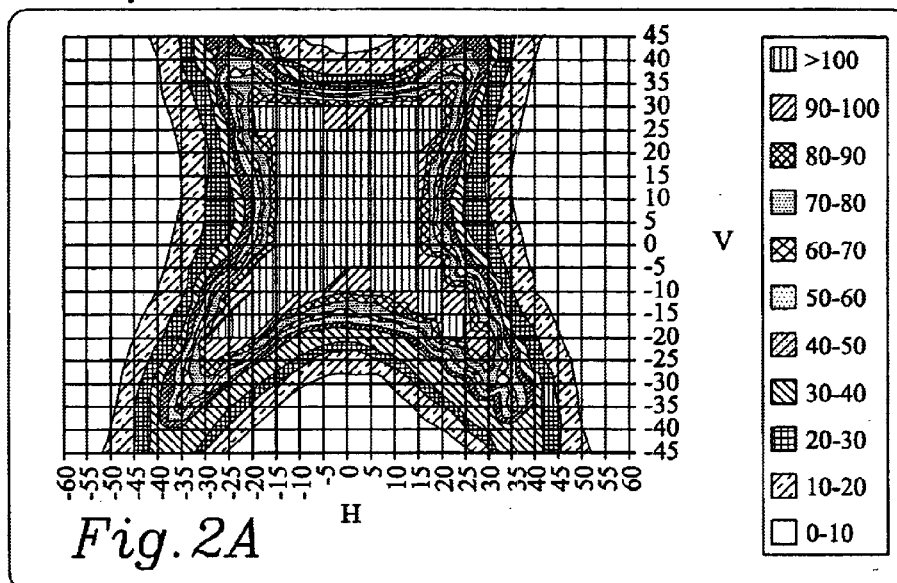
Figure 2B:
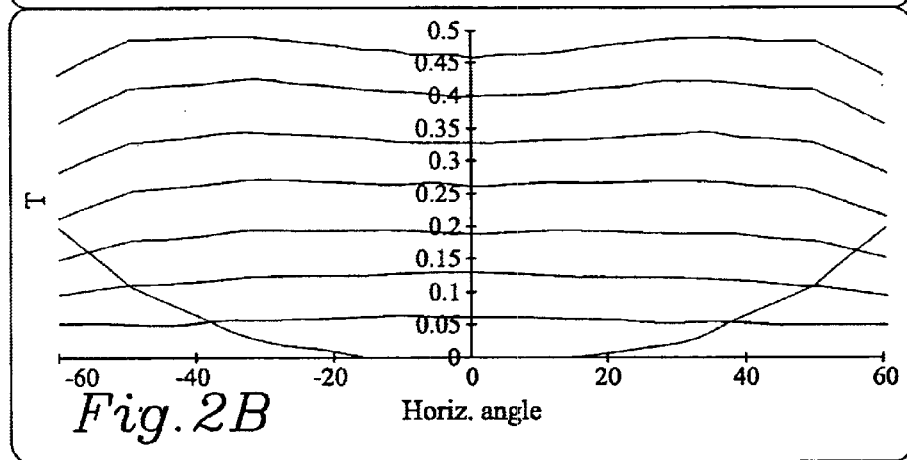
Figure 2C:
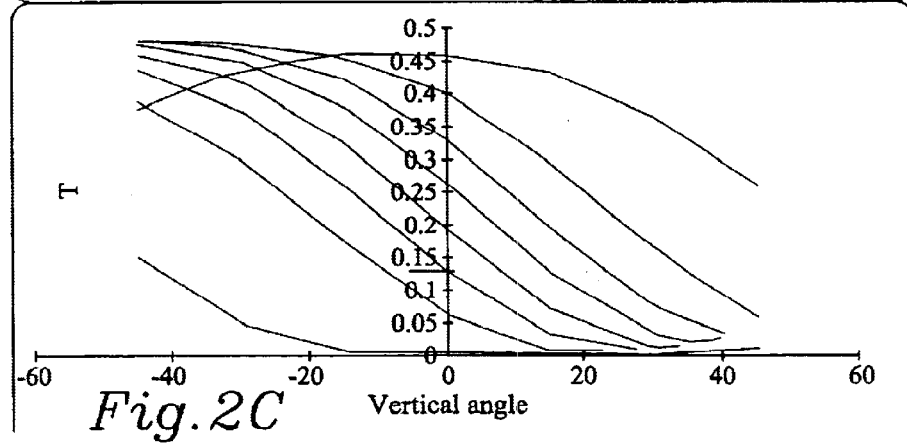

FIGS. 2A–C illustrate the simulated operating characteristics of the display of FIG. 1;

FIGS. 3A–C illustrate the simulated operating characteristics of a conventional display having a negative birefringence retarder in the optical path.

Figure 4:
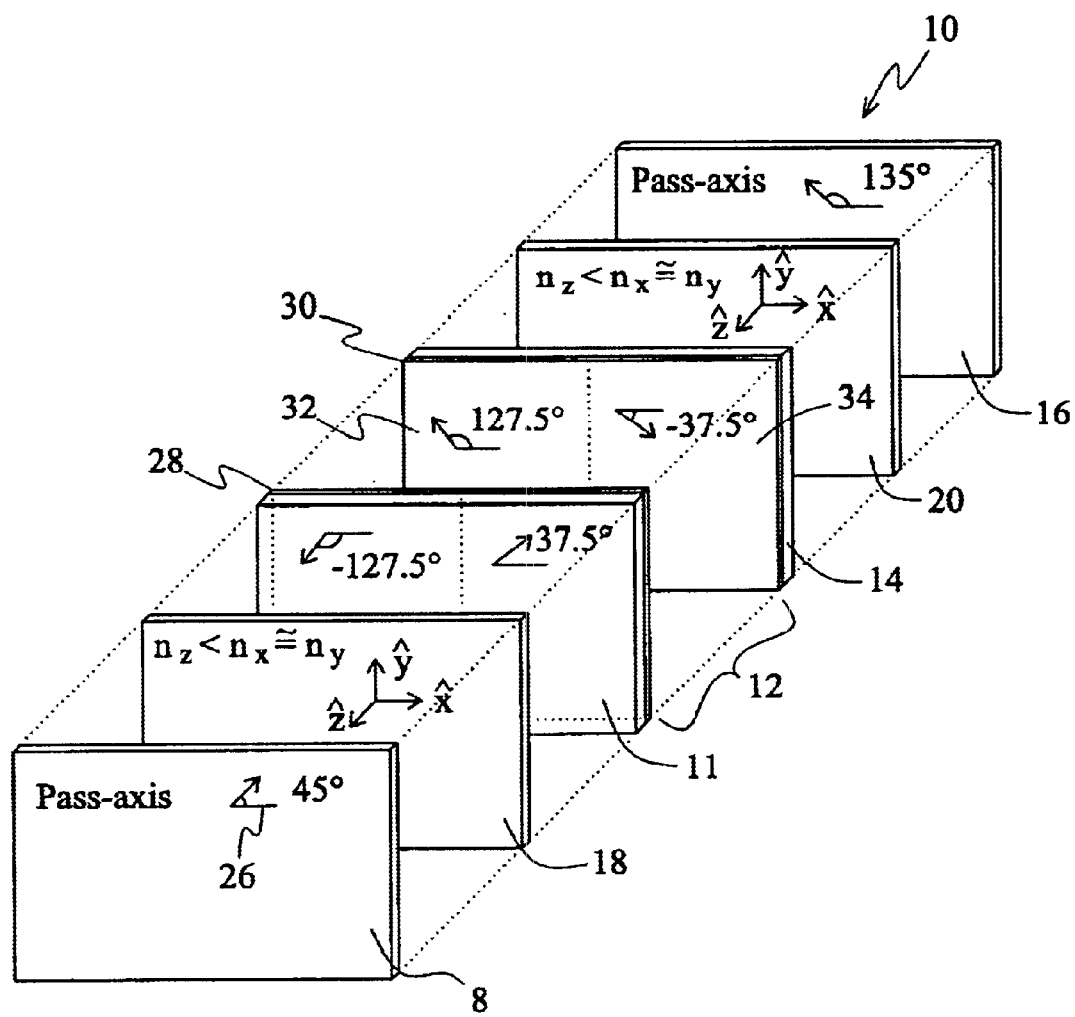

FIG. 4 is an exploded schematic view of a liquid crystal display in accordance with various aspects of the present invention.

Figure 5A:
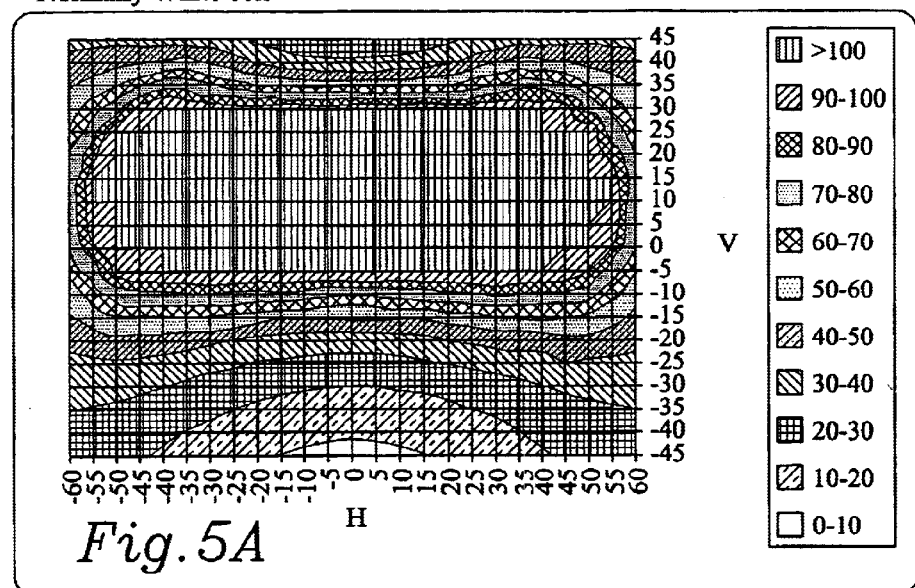
Figure 5B:
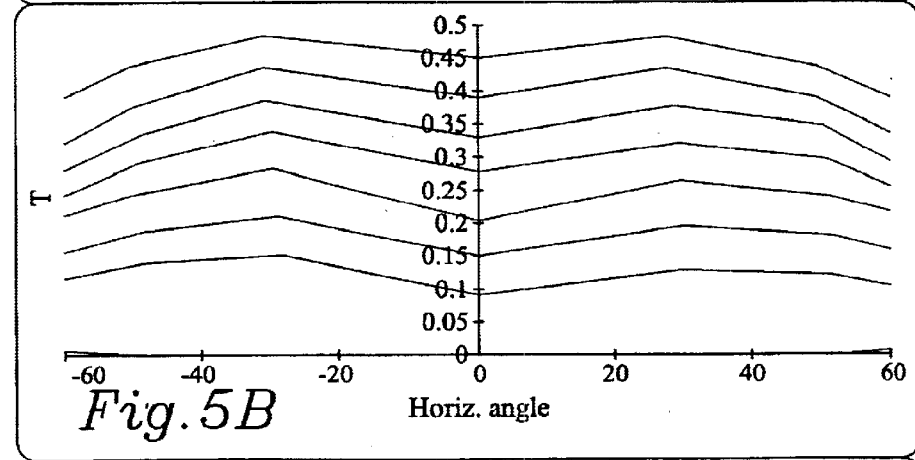
Figure 5C:
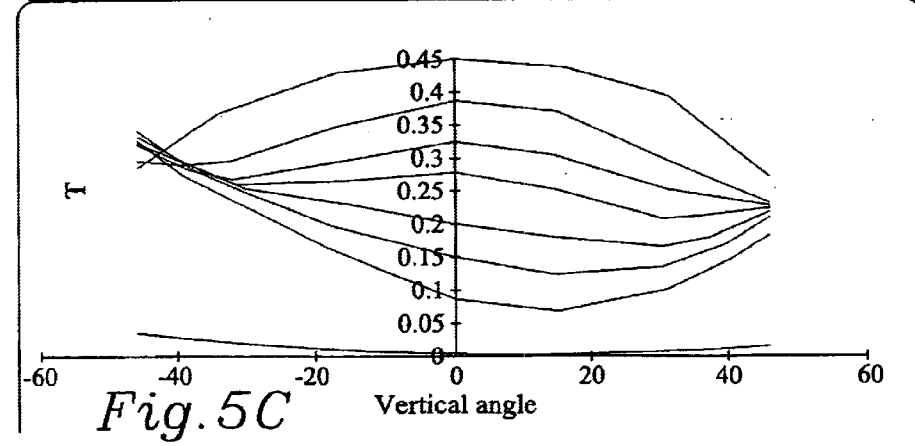

FIGS. 5A–C illustrate the simulated operating characteristics of a dual domain display having balanced compensation and a vertically shifted viewing envelope.

Figure 6:
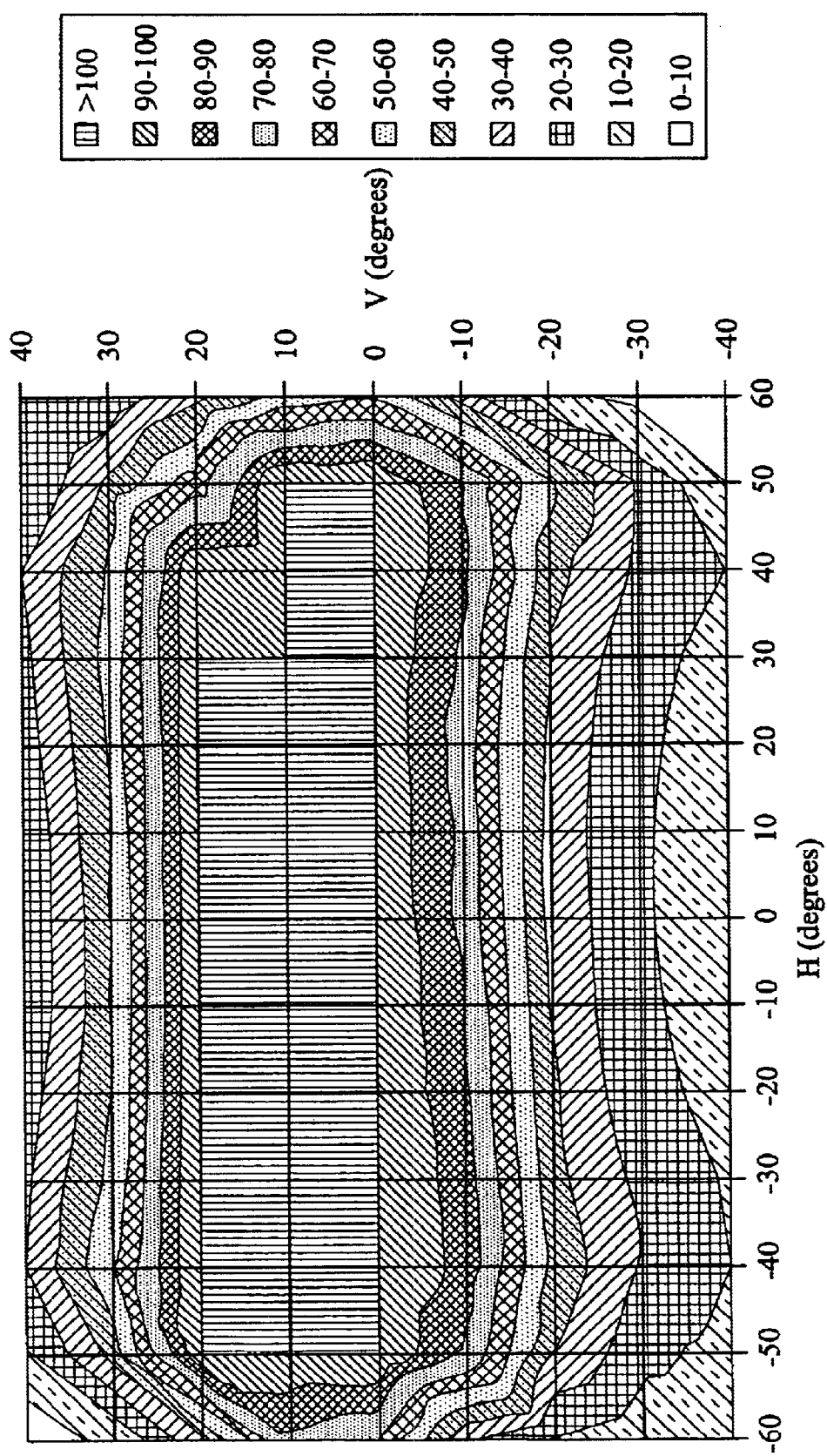

FIG. 6 illustrates the measured operating characteristics of a dual domain display having balanced compensation and a vertically shifted viewing envelope.

FIGS. 7A–C illustrate the simulated operating characteristics of a single domain display having balanced compensation and a vertically shifted viewing envelope.

Figure 8A:
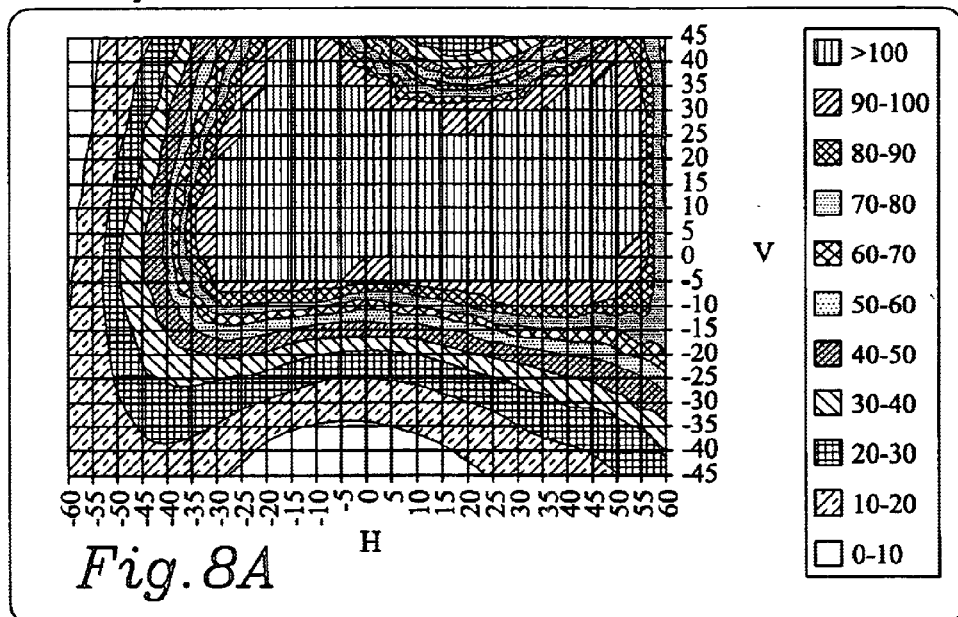
Figure 8B:
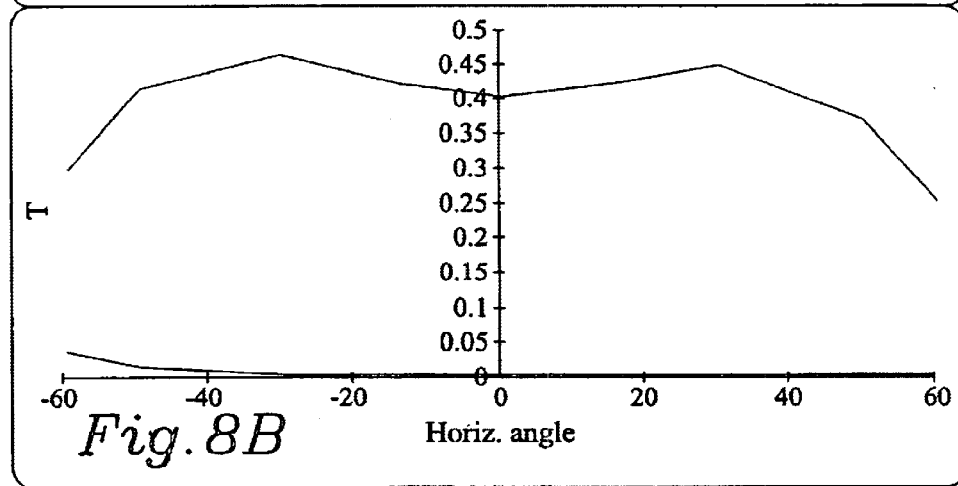
Figure 8C:
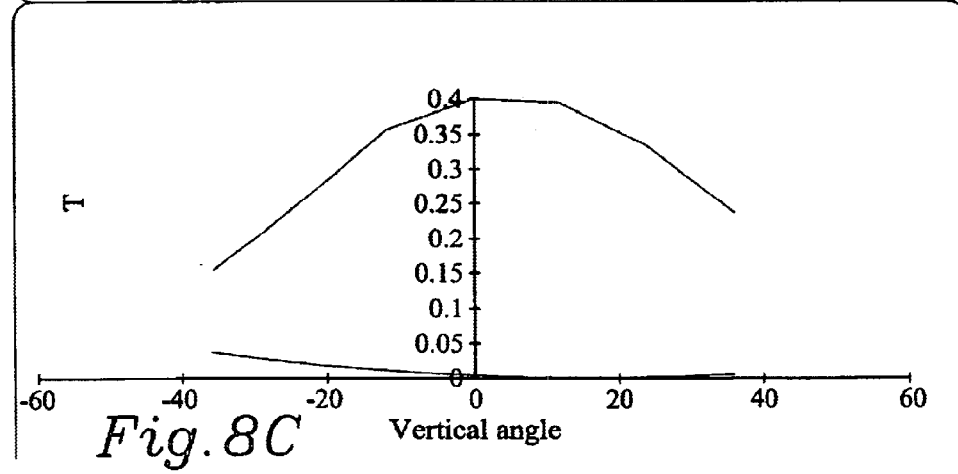

FIGS. 8A–C illustrate the simulated operating characteristics of a single domain display having unbalanced compensation and a vertically shifted viewing envelope.

Figure 9:
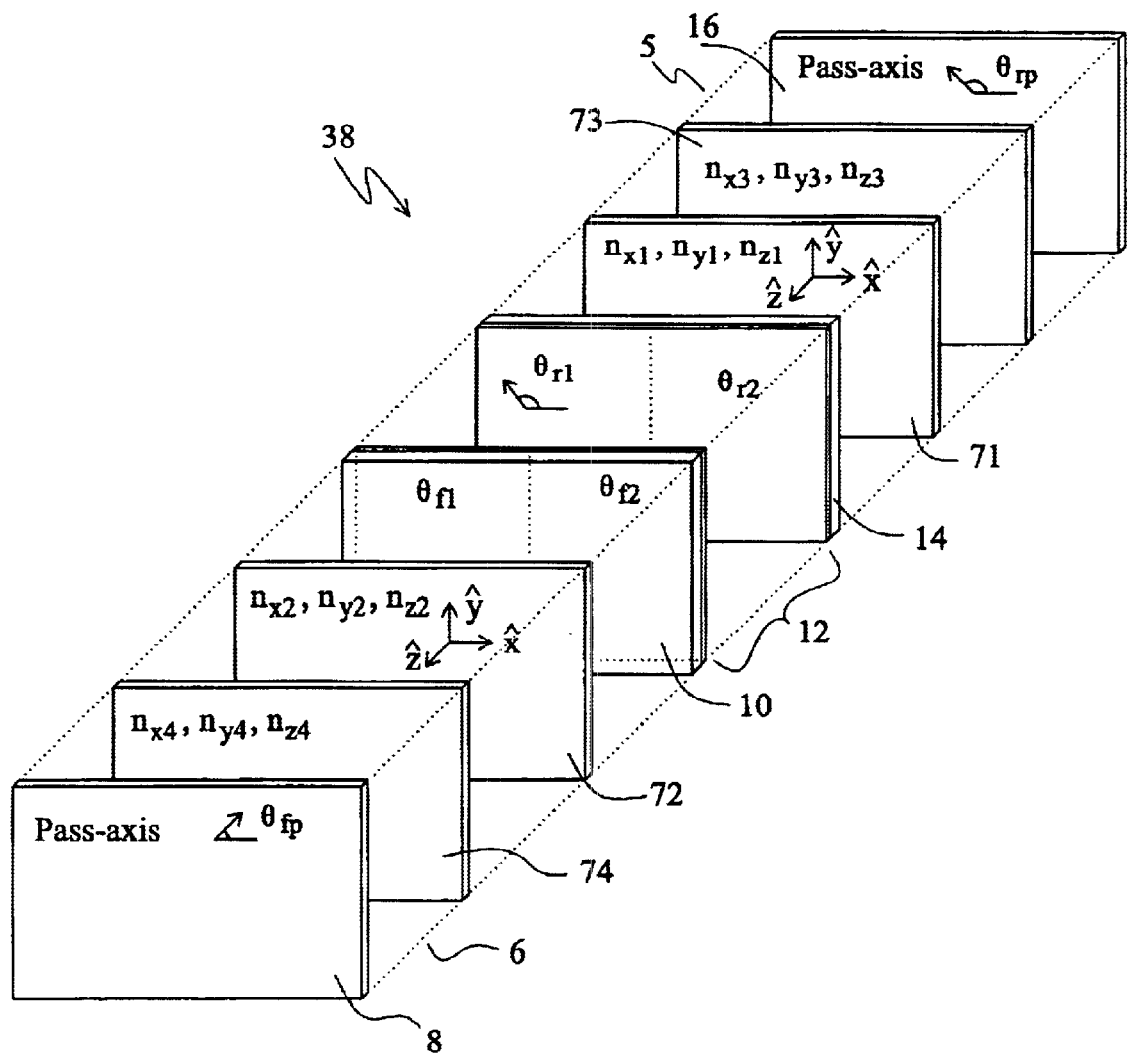

FIG. 9 is an exploded schematic view of an alternative liquid crystal display in accordance with various aspects of the present invention employing at least four retarders.

Figure 10A:
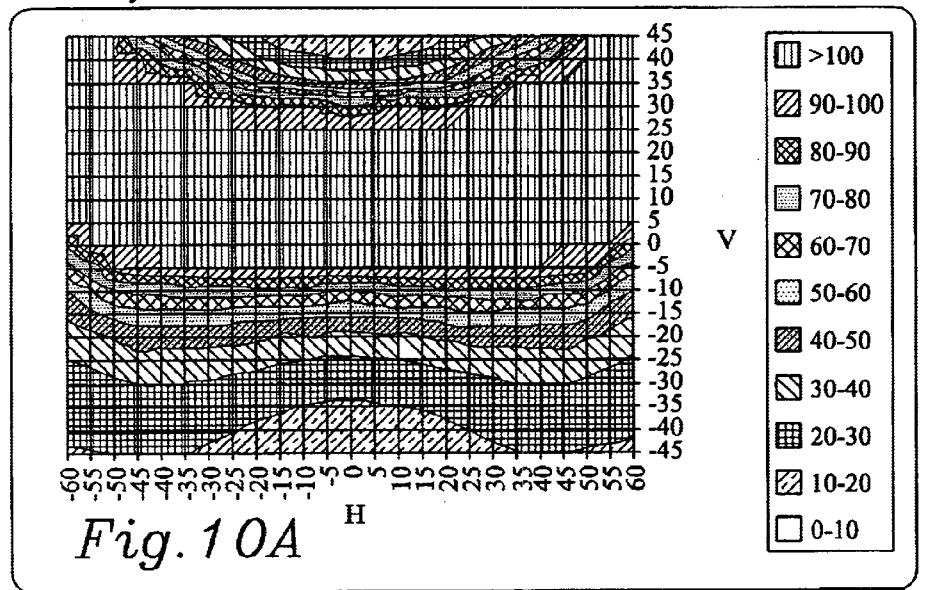
Figure 10B:
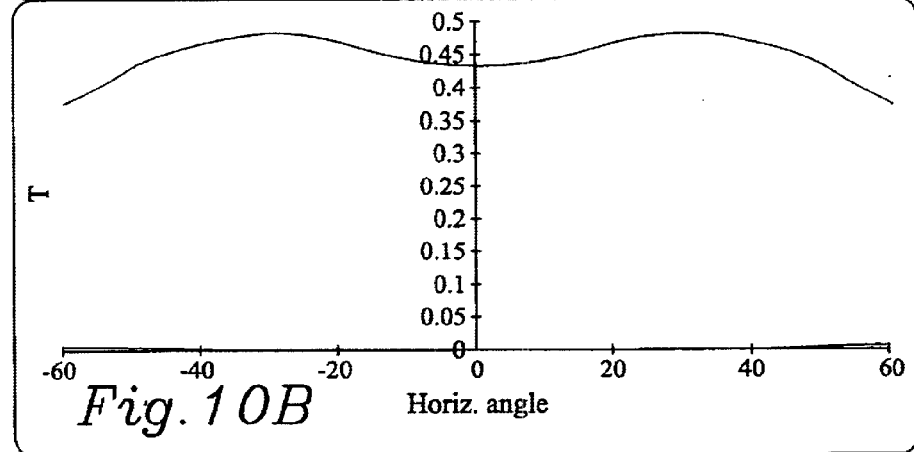
Figure 10C:
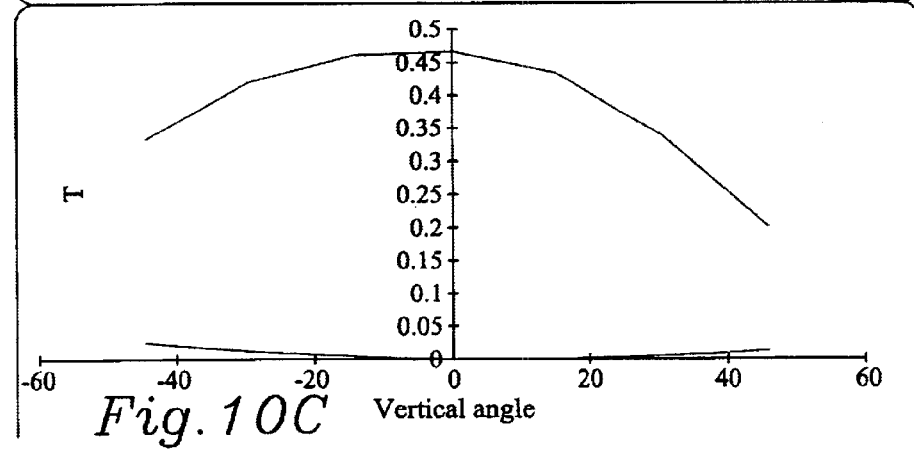

FIGS. 10A–C illustrate the simulated operating characteristics of a single domain display having balanced compensation and a vertically shifted viewing envelope.

Figure 11A:
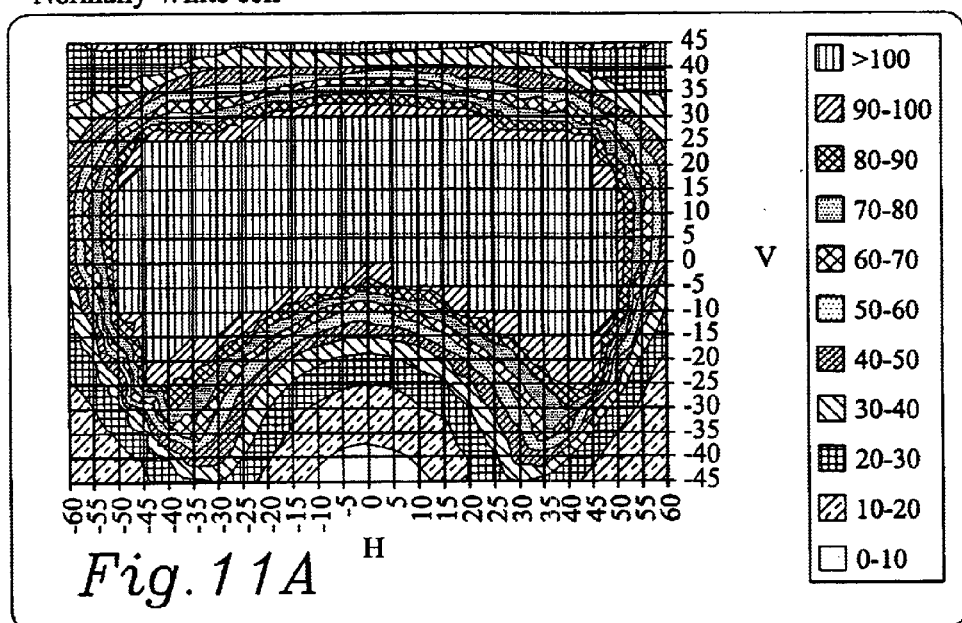
Figure 11B:
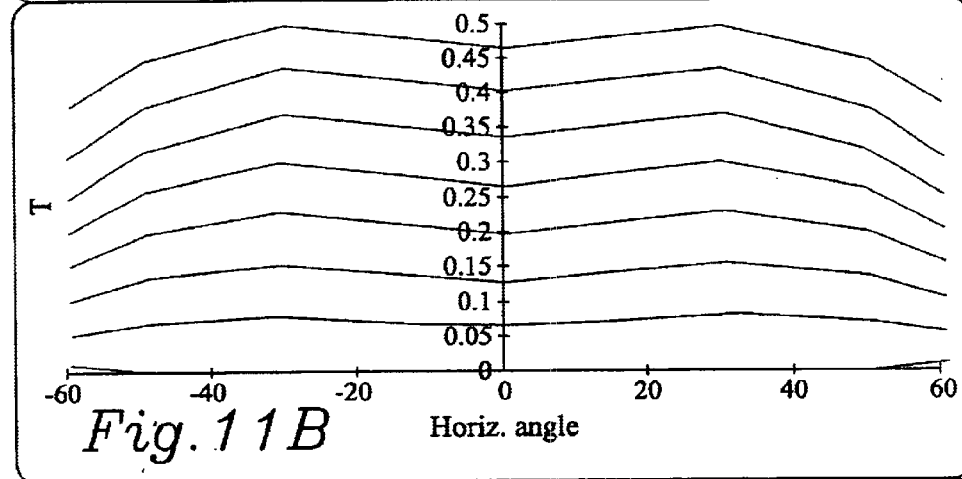
Figure 11C:
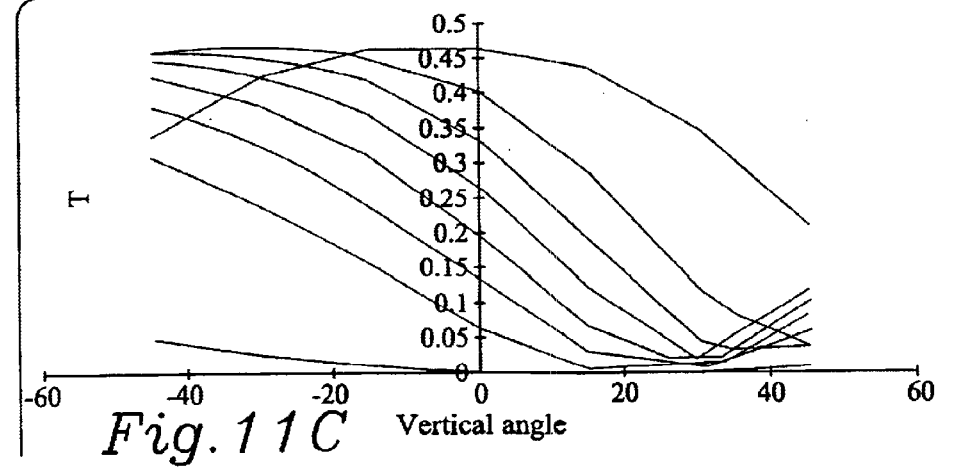

FIGS. 11A–C illustrate the simulated operating characteristics of a single domain display having balanced compensation and a vertically shifted viewing envelope.

Figure 12A:
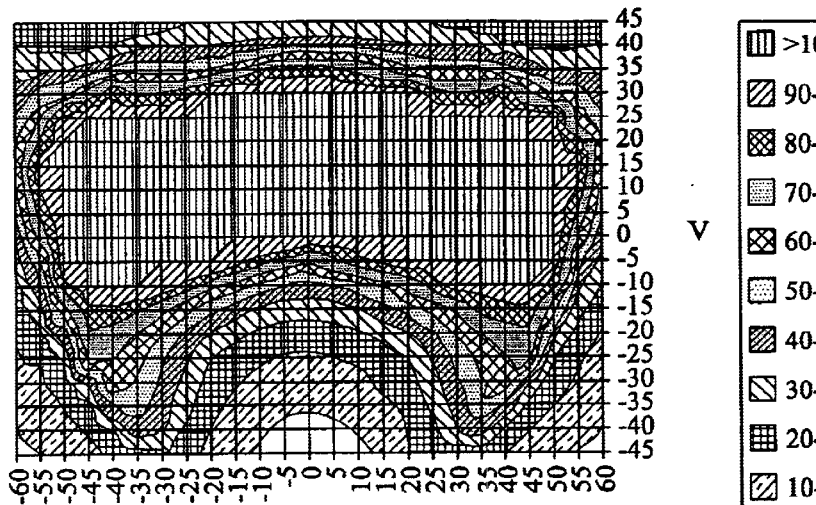
Figure 12B:
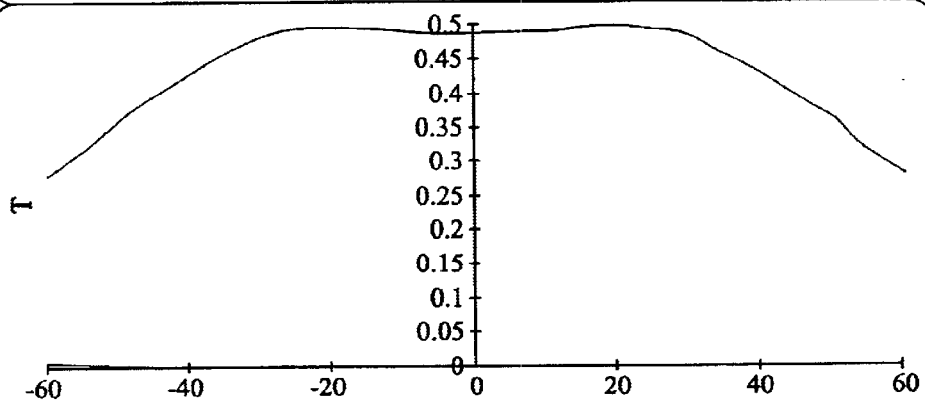
Figure 12C:
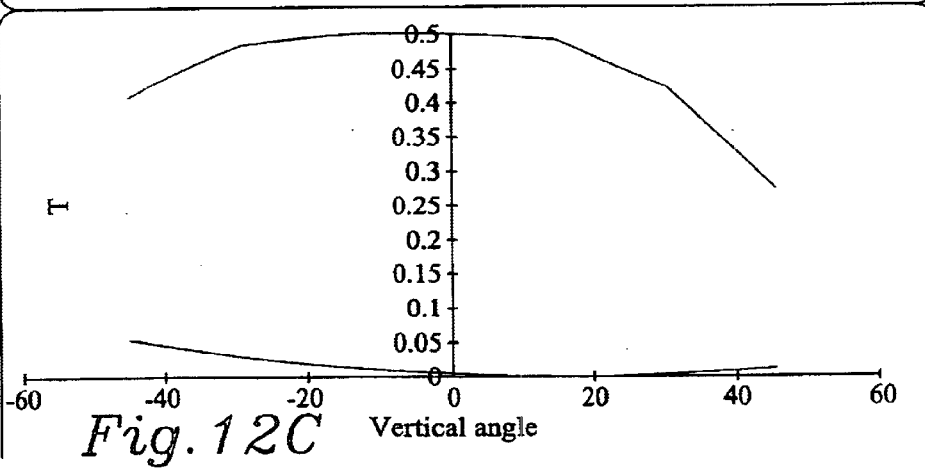

FIGS. 12A–C illustrate the simulated operating characteristics of a single domain display having balanced compensation and a vertically shifted viewing envelope.

Figure 13A:
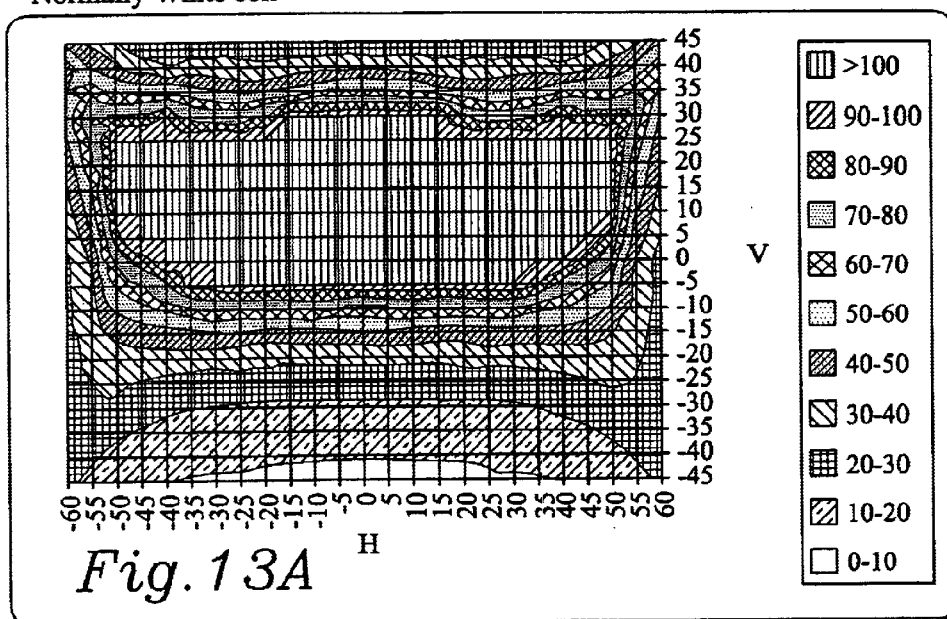
Figure 13B:
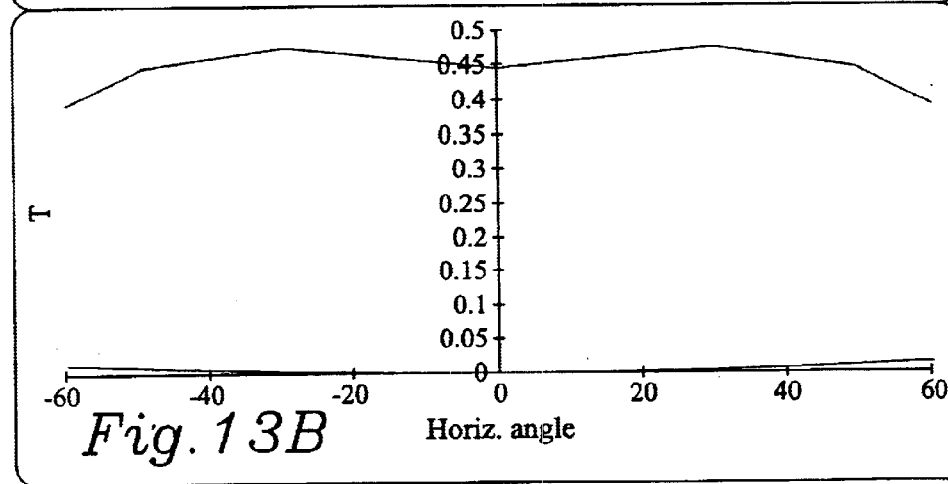
Figure 13C:
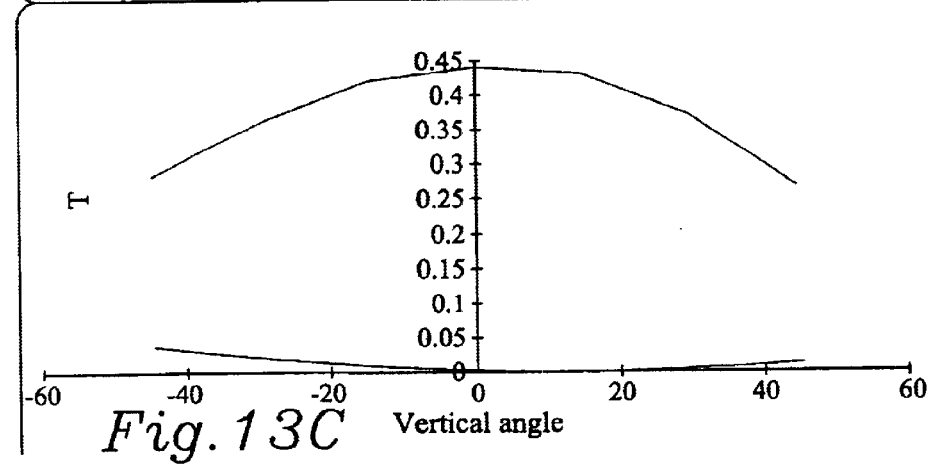

FIGS. 13A–C illustrate the simulated operating characteristics of a dual domain display having balanced compensation and a vertically shifted viewing envelope.

Figure 14:
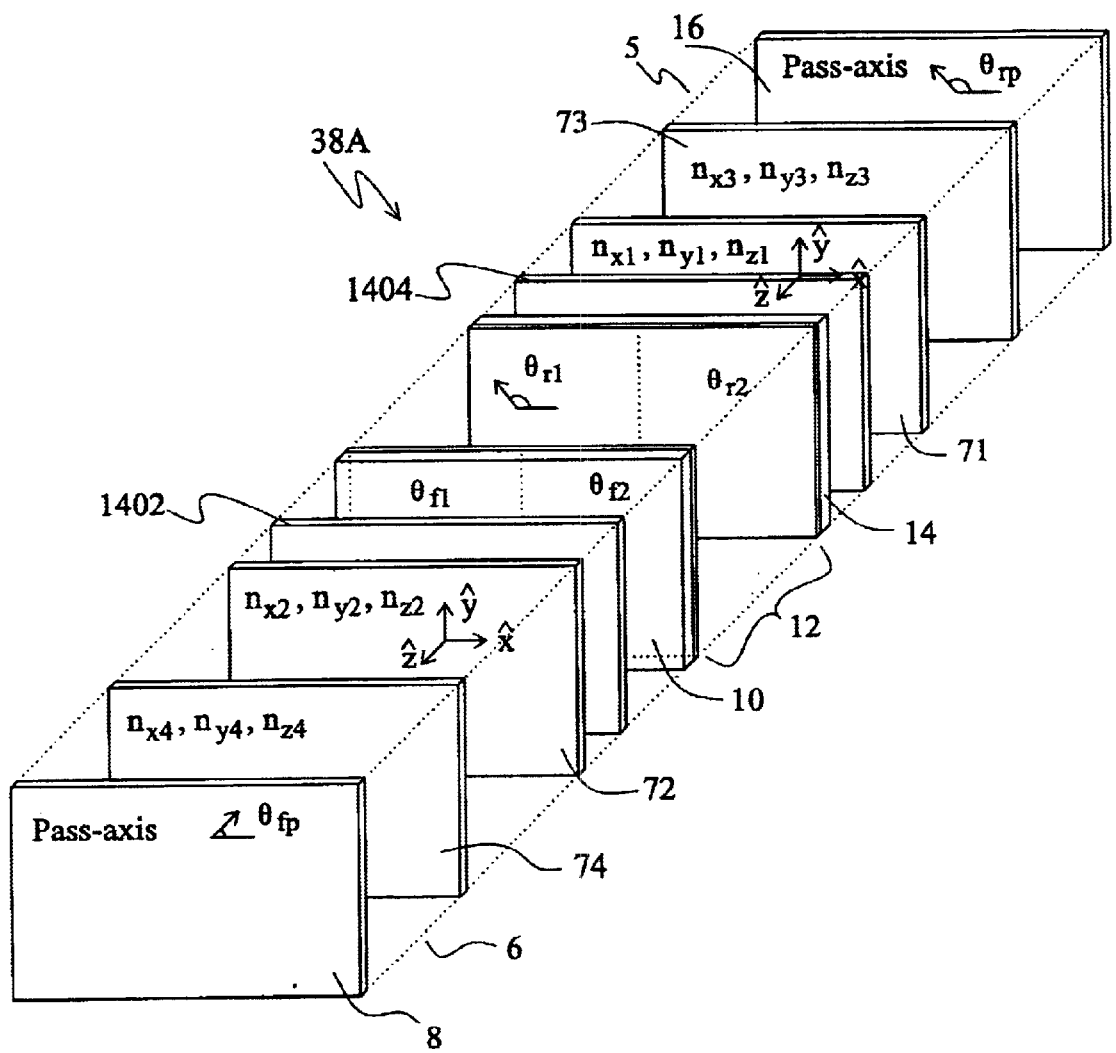

FIG. 14 is an exploded schematic view of an alternative liquid crystal display in accordance with various aspects of the present invention employing oblique retarders.

DETAILED DESCRIPTION OF PREFERRED EXEMPLARY EMBODIMENTS

The subject matter of the present invention is particularly suited for use in connection with displays, such as liquid crystal displays (LCDs). As a result, the preferred exemplary embodiment of the present invention is described in that context. It should be recognized, however, that such description is not intended as a limitation on the use or applicability of the present invention, but is instead provided merely to enable a full and complete description of a preferred embodiment.

Referring to FIG. 4, an LCD 10 configured in accordance with various aspects of the present invention is configured for an adjusted vertical viewing envelope several degrees, such as approximately 15 degrees, from the perpendicular. The LCD 10 suitably comprises: a front polarizer 8, a first substrate 11, a liquid crystal layer 12, a second substrate 14, and a rear polarizer 16. LCD device 10 may additionally include any number of conventional LCD elements known to those skilled in the art; such conventional elements are neither shown in the figures nor described in detail herein. All of these components are suitably sandwiched between a cover glass 4 and, for a transmissive display, a backlight 18. Each of these components suitably comprises a conventional component for a display.

The respective polarization directions of the front and rear polarizers 8, 16 suitably define a conventional angle for LCDs, such as a 90 degree angle, which is typical for normally white LCDs. In the illustrated embodiment, the front polarizer 8 exhibits a pass axis of 45 degrees relative to a reference axis 26 (e.g., the horizontal axis of the LCD 10 in FIG. 1) and the rear polarizer 16 exhibits a pass axis of 135 degrees relative to the reference axis 26. For purposes of this description, front polarizer 8 is proximate the front portion of LCD device 10 (i.e., facing the viewer) and rear polarizer 16 is proximate the rear portion of LCD device 10.

The first and second substrates 11, 14 are suitably sandwiched between the front and rear polarizers 8, 16. A first alignment film 28 is located on first substrate 11 and, similarly, a second alignment film 30 is located on second substrate 14. The first and second alignment films 28, 30 face one another and liquid crystal layer 12 resides between the first and second alignment films 28, 30.

Molecules of the liquid crystal material 12 exhibit a twist angle through which they rotate in response to a voltage applied to the LCD device 10. The twist angle is associated with the alignment directions of the first and second alignment films 28, 30. The first and second alignment films 28, 30 may be associated with any suitable number of rubbing directions relative to a reference axis, e.g., reference axis 26 corresponding to the horizontal axis of the display 10 shown in connection with the front polarizer 8.

The present exemplary embodiment comprises a normally white twisted nematic display. Although the present exemplary embodiment is described in conjunction with a compensated normally white twisted nematic LCD, various aspects of the present invention may also be utilized with uncompensated normally white LCDs and normally black LCDs, whether compensated or uncompensated, and various other types of displays, such as transmissive or reflective displays. It should be noted that several specific twist angles, vertical shift angles, viewing ranges, and the like are presented herein for exemplary and pedagogical purposes only and that such quantities are not intended to limit the scope of the present invention.

In the present exemplary embodiment, a front retarder 18 and a rear retarder 20 are sandwiched between the front and rear polarizers 8, 16 to provide balanced compensation.

As shown, the front and rear retarders 18, 20 are suitably adjacent to the front and rear polarizers 8, 16, respectively. Balanced compensation may be appropriate in various applications to increase the horizontal viewing angle range in a relatively symmetric manner. Balanced compensation suitably enhances the optical quality of LCD device 10 over a relatively wide horizontal viewing range. Unlike unbalanced compensation techniques, balanced compensation provides a substantially symmetric horizontal viewing angle range without dramatic inconsistencies in contrast ratio. Accordingly, the present LCD 10 includes the front retarder 18 and the rear retarder 20 to provide balanced compensation, though one or both retarders may be omitted in various configurations.

The front and rear retarders 18, 20 are preferably configured to provide LCD 10 with balanced compensation for horizontal viewing angle limitations associated with LCD device 10. In a preferred embodiment, the front and rear retarders 18, 20 are substantially identical in configuration. The separation and the front and rear distribution of the compensation elements reduces the asymmetry normally associated with unbalanced compensation techniques. The front and rear retarders 18, 20 are preferably configured as negative birefringence retarders having their respective optical axes perpendicular to the associated planes defined by front and rear retarders 18, 20. The total retardation (d$\Delta$n, where d is the thickness of the retarder and $\Delta$n is the birefringence of the retarder) of each retarder is preferably within the approximate range of one-quarter to one-half of the comparable product (d$\Delta$n, where d is the cell gap and $\Delta$n is the birefringence of the liquid crystal material 12) for the liquid crystal material 12.

Other embodiments of LCDs according to various aspects of the present invention may not require balanced compensation, and the LCD 10 may incorporate more or less than two retarders as necessary for the particular application. Indeed, the preferred embodiment of the present invention is compatible with any birefringence compensation technique, whether such technique is balanced or unbalanced, and LCD device may alternately employ one or more biaxial retarders or one or more uniaxial retarders (having coplanar birefringence).

The LCD 10 of the present exemplary embodiment may be configured with one or more domains. The present exemplary embodiment of the LCD 10 is configured as a dual-domain display. The multiple-domain configuration enables LCD device 10 to provide increased uniformity in gray levels with viewing angle variations and enhanced contrast. The first alignment layer 28 of the present exemplary embodiment is suitably partitioned to define a first domain 32 and second domain 34, each having a distinct alignment direction associated therewith. Similarly, second alignment film 30 may also be partitioned to define first and second domains 32 and 34. The LCD 10 may include any number of domains as necessary for the particular application. Although the multiple domains are preferably formed within first and second alignment films 28, 30, the LCD 10 may equivalently employ a plurality of separate alignment films that define two or more domains. In practice, the dual-domain configuration may be formed by multiple patterned rubbing, by photoalignment or by any other appropriate technique.

In the exemplary embodiment depicted in FIG. 1, the first domain 32 of the first alignment layer 28 is associated with a rubbing direction of −127.5 degrees relative to reference axis 26, and the first domain 32 of the second alignment layer 30 is associated with a rubbing direction of 127.5 degrees for a difference of 75 degrees. In accordance with conventional terminology, the twist angle is defined to be the angle of rotation from the rubbing direction defined by the second alignment film 30 to the alignment direction (i.e. the opposite direction of the rubbing direction) of the first alignment film 28. Where, as in this embodiment, liquid crystal material 18 exhibits a left-handed twist, the corresponding twist angle is 75 degrees (which is 15 degrees less than the 90 degree twist angle commonly employed in conventional LCDs). The second domain 34, on the other hand, is suitably associated with rubbing directions of −37.5 and 37.5 degrees relative to reference axis 26; the corresponding twist angle is 105 degrees, which is 15 degrees greater than the 90 degree twist angle commonly employed by prior art LCDs.

The twist angles of the compensated LCD 10 effectively shift the viewing envelope from the perpendicular according to the magnitude of the twist angle relative to the conventional 90 degree twist angle. In the presence of negative birefringence compensation for a field-driven LCD, the net effect of varying the twist angle is dramatic. In accordance with the present invention, the center of the high-contrast vertical viewing envelope is shifted upwards by about 15 degrees in response to the reduction of the twist angle from 90 degrees to 75 degrees. Correspondingly, the 105 degree twist angle in the second domain 34 similarly shifts the viewing envelope upwards by about 15 degrees. Though a 105 degree twist angle in the first domain 32 would result in a downward shift of the high-contrast vertical viewing envelope, because the rubbing axes have been rotated by 180 degrees in second domain 34, the net effect is an upward shift of the vertical viewing envelope. Thus, when first and second domains 32 and 34 are averaged by simultaneous viewing, the high-contrast region is not compromised.

The 15 degree upward shift may be desirable for a particular application of the LCD 10. The vertical viewing angle range of the LCD may be customized, however, to suit the specific needs of other applications by suitably increasing or decreasing the twist angle. The twist angle may be adjusted by altering the rubbing directions associated with first and second alignment films 28, 30.

FIGS. 5A–C and 6 illustrate the performance of the LCD 10 as described above in simulations and actual testing a high-contrast viewing envelope 36 having a contrast ratio between about 90 and 100 is vertically shifted upward by approximately 10 to 15 degrees relative to a perpendicular line of sight relative to the plane of LCD device 10.

Furthermore, the relatively wide (approximately±50 to 60 degrees from the center of LCD device 10) and substantially symmetric high-contrast horizontal viewing range resulting from the use of balanced compensation and the dual-domain nature of the LCD 10 is apparent. Because vertical shifting of the viewing angle is at least partially dependent upon the various rubbing directions of the alignment layers 28, 30, the amount of upward or downward vertical shifting may be customized for the specific application during manufacturing of LCD device 10. Further, any suitable technique and/or element may be employed to adjust the twist angle of liquid crystal material 12 to facilitate vertical shifting of the viewing angle.

In addition, a selected vertical viewing angle may be achieved in conjunction with retarders, either in addition to or instead of adjusting the twist angle of the alignment layers 28, 30. For example, the LCD 10 may be configured as a single domain display having a conventional twist angle of approximately 90 degrees. The front and rear retarders 18, 20 are preferably configured as vertically shifting retarders for shifting the viewing envelope in the vertical direction. In the present exemplary embodiment, the shifting retarders 18, 20 comprise biaxial retarders (i.e., $n_z \neq n_y \neq n_x$) having their respective optical axes perpendicular to the associated planes defined by front and rear retarders 18, 20. In the present exemplary embodiment, each retarder 18, 20 shifts the phase of the z component of the light by about 145 nm and the phase of the x component about 5.8 nm with respect to the y component (i.e., $n_z < n_x < n_y$, 145 nm (y-z), 5.8 nm (y-x)). The shifting of the z component configuration provides balanced compensation, which results in a relatively wide horizontal viewing range. The shifting of the x component, on the other hand, tends to shift the vertical viewing envelope upward by approximately 15 degrees. The results of simulations according to this configuration of the LCD 10 are illustrated in FIGS. 7A–C, which depict the shifting of the vertical viewing envelope and the wide horizontal viewing angle range.

The configuration of the LCD 10 may be further varied to achieve preferred viewing envelopes both horizontally and vertically. For example, the viewing envelope may be shifted both horizontally and vertically by adjusting the twist angle of the liquid crystal 12 and configuring the at least one of the front and rear retarders 18, 20 as a horizontal shifting retarder. In the present exemplary embodiment, the rear retarder 20 is omitted, and the front retarder 18 comprises a negative birefringent retarder such that the z component of the light (perpendicular to the surface of the retarder 18) is shifted approximately 315 nm relative to the x and y components. The single retarder 18 provides unbalanced compensation, causing the horizontal viewing envelope to shift. The amount and direction of the shift may be adjusted according to the magnitude and polarity of the retardance.

To effect the desired vertical viewing angle, such as 15 degrees, a suitably twist angle is provided for the liquid crystal 12. In the present single-domain LCD 10, a twist angle of 75 degrees is implemented by a rubbing direction of −37.5 degrees for the rear alignment layer 30 and 37.5 degrees for the front alignment layer 28. As a result, the viewing envelope tends to shift according to the configuration of the LCD 10. The results associated with a simulation of an LCD 10 according to the present exemplary embodiment are illustrated in FIGS. 8A–C. The configurable viewing envelope facilitates adaptation of the LCD 10 to various applications in which certain viewing angles may be favored, such as in cockpit applications.

An LCD 38 according to various aspects of the present invention may also be configured in conjunction with other types of retarders and/or additional retarders to accommodate various configurations or operating characteristics. Where appropriate, elements of LCD 38 that are similar or identical to corresponding elements of the LCD are identified with the same reference numbers. For example, referring to FIG. 9, a second configuration of the LCD 38 suitably includes the front and rear polarizers 8, 16, the first and second substrates 11, 14, and the liquid crystal layer 12. The LCD 38 further suitably includes a first retarder 71 a second retarder 72, a third retarder 73, and a fourth retarder 74 sandwiched between the front and rear polarizers 8, 16. Specifically, LCD 38 utilizes additional shifting retarders having functional characteristics that facilitate vertical shifting in a compensated LCD and provide various other advantages. As with LCD 10, LCD 38 may be configured as a multiple-domain element.

The front and rear polarizers 8, 16, the first and second substrates 11, 14, and the liquid crystal material 12 may all be substantially as described above in connection with the previously described configurations of the LCD 10. The alignment layers 28, 30 are suitably configured conventionally, for example to provide a twist angle of 90 degrees formed with a rubbing direction of −135 degrees on the front alignment layer 28, and a rubbing direction of 135 degrees relative to the same reference axis on the rear alignment layer 30. In a conventional LCD utilizing a birefringence compensation scheme, a 90 degree twist angle optimizes the viewing envelope for high contrast when viewed from a line of sight perpendicular to the incident plane of the LCD, i.e., the high-contrast viewing envelope is not be vertically shifted. However, the alternate embodiment depicted in FIG. 9 suitably employs at least one additional shifting retarder to accomplish vertical shifting.

As shown in FIG. 9, LCD device 38 preferably includes the fourth retarder 74 located between front polarizer 8 and second retarder 72. The fourth retarder 74 is suitably configured as a shifting retarder to adjust the vertical viewing envelope of the LCD 38. Similarly, LCD device 38 preferably includes the third retarder 73, also suitably configured as a shifting retarder, which may be located between the rear polarizer 16 and the first retarder 71. The specific locations of the various retarders may vary from those shown in FIG. 9. In a first embodiment, the LCD 38 provides balanced compensation and a vertically shifted viewing envelope by configuring the first and second retarders 71, 72 as negative birefringence retarders and the third and fourth retarders as conventional retarders. More specifically, the first and second retarders 71, 72 are configured to negatively shift the z component of the light 150 nm with respect to the x and y components ($n_z<n_x=n_y$, 150 nm). The third and fourth retarders 73, 74 suitably comprise conventional retarders such that either the x or the y component, or a combination of the x and y components, is positively shifted with respect to the z component. In the present exemplary embodiment, the third and fourth retarders 73, 74 are configured to positively shift the y component of the light 5.8 nm with respect to the x component (5.8 nm at 90 degrees).

The shifting of the z component provides balanced compensation, which results in a relatively wide horizontal viewing range. The positive shifting of the y component, on the other hand, tends to shift the vertical viewing envelope upward by approximately 15 degrees. The results of simulations according to this configuration of the LCD 10 are illustrated in FIGS. 10A–C, which depict the shifting of the vertical viewing envelope and the wide horizontal viewing angle range. It may be noted that the present configuration is functionally similar to the embodiment described in conjunction with FIGS. 7A–C, but instead of using biaxial retarders to negatively shift the z and x components, birefringence retarders and conventional retarders are combined to achieve a similar effect.

Alternatively, each of the four retarders 71, 72, 73, 74 may be configured as a conventional retarder. For example, in an alternative embodiment, the first and second retarders 71, 72 are suitably configured to positively shift the y component 131.25 nm relative to the z component (131.25 nm at 90 degrees), and the third and fourth retarders 73, 74 positively shift the x component 125 nm relative to the z component (125 nm at 0 degrees). The effect of this configuration is to provide a wide horizontal viewing envelope and a vertical shifted viewing envelope while maintaining high contrast with no contrast reversal over a large range. The results of simulations for such a configuration are illustrated in FIGS. 11A–C.

The LCD 38 may also be configured to combine the use of four conventional retarders and a selected twist angle. For example, in another alternative embodiment, the first and second retarders 71, 72 are suitably configured to positively shift the y component 125 nm relative to the z component (125 nm at 90 degrees), and similarly, the third and fourth retarders 73, 74 positively shift the x component 125 nm relative to the z component (125 nm at 0 degrees). A twist angle of 70 degrees may be implemented in a single domain with a rubbing direction of 125 degrees on the rear alignment layer 30 and −125 degrees on the front alignment layer 28. This configuration also provide a wide horizontal viewing envelope using the conventional retarders and a vertical shifted viewing envelope due to the twist angle. The results of simulations for such a configuration are illustrated in FIGS. 12A–C.

Yet another configuration of the LCD 38 according to various aspects of the present invention includes four conventional retarders and an adjusted twist angle to provide vertical shifting of the viewing envelope. The first and second retarders 71, 72 are suitably configured to positively shift the most of the x component and a fraction of the y component 137.5 nm relative to the z component (137.5 nm at 5 degrees and −5 degrees, respectively), and similarly, the third and fourth retarders 73, 74 positively shift the most of the y component and a fraction of the x component 137.5 nm relative to the z component (137.5 nm at 95 degrees and 85 degrees, respectively). The present exemplary embodiment includes a dual domain display such that the first domain has a twist angle of 105 degrees associated with rubbing directions of −37.5 degrees on the rear alignment layer 30 and 37.5 degrees on the front alignment layer 28. The second domain has a twist angle of 75 degrees associated with rubbing directions of 127.5 degrees on the rear alignment layer 30 and −127.5 degrees on the front alignment layer 28. This configuration also provides a very wide horizontal viewing envelope using the conventional retarders and a vertical shifted viewing envelope due to the complementary variations in the twist angles. Variations from the target retardances values in the retarders may be tolerated, especially when the actual retardance values are relatively well matched. The results of simulations for such a configuration are illustrated in FIGS. 13A–C.

The various configurations of displays according to various aspects of the present invention may also include oblique retarders. For example, referring to FIG. 14, an LCD 38A further suitably includes a first oblique retarder 1402, suitably disposed between the second retarder 72 and the first substrate 11, and a second oblique retarder 1404, suitably disposed between the second substrate 14 and the first retarder 71. The oblique retarders retard selected components of incident light like other retarders, but the reference axes for identifying the x, y, and z components are skewed from the conventional horizontal, vertical, and perpendicular axes. Suitable obligue retarders are commercially available, such as oblique retarders available from FUJI or NIPPON PETROCHEMICAL.

The first and second oblique retarders of the present exemplary embodiment are suitably configured to compensate for the tilt of portions of the liquid crystal material 12 near the substrates 11, 14. Liquid crystal near these boundaries tends to retain a tilt, regardless of the application or absence of an electrical field, which tends to degrade the performance of the display in conjunction with the various retarders 71–74. The axes of the oblique retarders 1402, 1404 may be selected and oriented according to the tilt of the liquid crystal at the substrate boundary.

In summary, the present invention provides an improved display having a customizable viewing envelope. An LCD device in accordance with the present invention can be designed and manufactured to meet the needs of specific applications, such as avionics. The amount and direction of horizontal and vertical shifting may be adjusted by adjusting the twist angle and/or the retarder characteristics to arrive at a desired angle and other characteristics. Further, the various shifting retarders may be alternatively configured to exhibit different optical and functional parameters than those described herein and that corresponding pairs of shifting retarders need not exhibit the same optical characteristics. In addition, the present invention may be employed in a single-domain or a multiple-domain LCD device to enable vertical shifting of the high-contrast viewing envelope.

While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements without departing from those principles.

What is claimed is:

1. A normally white twisted nematic liquid crystal (LCD) device having a vertically shifted high contrast viewing envelope comprising:

a first substrate;

a second substrate proximate said first substrate;

a liquid crystal material located between said first and second substrates, said liquid crystal material having a twist angle associated therewith, wherein said twist angle deviates from 90 degrees to facilitate a vertical shifting of said high contrast viewing envelope of said LCD device by 10 degrees or more; and a retarder means for compensating for horizontal view angle limitations of said normally white twisted nematic LCD device.

2. An LCD device according to claim 1, further comprising:

a first alignment film located on said first substrate, said first substrate, said first alignment film having a first rubbing direction relative to a reference axis; and a second alignment film located on said second substrate, said second alignment film having a second rubbing direction relative to said reference axis; wherein said twist angle is determined by said first and said second rubbing directions and wherein said vertical shifting of said viewing envelope is dependent upon said first and second rubbing directions.

3. An LCD device according to claim 2, wherein said retarder means for compensating comprises a birefringence retarder having a perpendicular optical axis, said birefringence retarder being located such that one of said first second substrates resides between said liquid crystal material and said birefringence retarder.

4. An LCD device according to claim 2, wherein said retarder means comprises a plurality of birefringence retarders configured to provide balanced compensation to said LCD device.

5. An LCD device according to claim 1, wherein:

said retarder means comprises at least one of a negative birefringence retarder having an optical axis which is perpendicular to the plane of said first substrate, a biaxial retarder, a conventional retarder, or an oblique retarder.

6. An LCD device according to claim 1, wherein said twist angle is within a first approximate range of 70 to 75 degrees or a second approximate range of 105 to 110 degrees.

7. An LCD device according to claim 6, wherein said vertical shifting of said viewing angle comprises a vertical shift within the range of 10 and 20 degrees.

8. A liquid crystal display (LCD) device having a vertically shifted high contrast viewing envelope comprising:

a first substrate;

a second substrate proximate said first substrate;

a liquid crystal material located between said first and second substrates, said liquid crystal material having a twist angle associated therewith, said twist angle differing from ninety (90) degrees by approximately fifteen (15) degrees or more, and;

retardation means for compensating for horizontal view angle limitations of said LCD device.

9. An LCD device according to claim 8, further comprising:

a first alignment film disposed on said first substrate, said first alignment film having a first rubbing direction relative to a reference axis; and a second alignment film disposed on said second substrate, said second alignment film having a second rubbing direction relative to said reference axis; wherein said twist angle is determined be said first and said second rubbing directions and wherein said vertical shifting of said viewing envelope is dependent upon said first and second rubbing directions.

10. An LCD device according to claim 8, wherein said retardation means comprises a uniaxial retarder exhibiting coplanar birefringence.

11. An LCD device according to claim 10, wherein said retardation means comprises at least one retarder exhibiting optical characteristics that facilitate vertical shifting of said high-contrast viewing envelope.

12. An LCD device according to claim 10, wherein said retardation means comprises a shifting retarder having an offset birefringence.

13. An LCD device according to claim 12, wherein said shifting retarder has an offset birefringence within the range of 4.0 to 8.0 nanometers.

14. An LCD device according to claim 8, wherein said retardation means comprises shifting retarders for vertically shifting said high-contrast viewing envelope.

15. An LCD device to claim 8 wherein said retarder comprises a biaxial retarder configured to provide an amount of differential retardance.

16. An LCD device according to claim 15, wherein:

said biaxial retarder is characterized by the relationship $n_z < n_x < n_y$;

said biaxial retarder exhibits a first differential retardance relative to a first axis; and said biaxial retarder exhibits a second differential retardance relative to a second axis.

17. An LCD device according to claim 16, wherein said first differential retardance is within the range of 100 to 200 nanometers and said second differential retardance is within the range of 4 to 8 nanometers.

18. An LCD device according to claim 16, wherein said biaxial retarder is located such that one of said first and second substrates resides between said liquid crystal material and said biaxial retarder.

19. A liquid crystal display (LCD) device comprising:
    a first substrate;
    a second substrate proximate said first substrate;
    a liquid crystal material located between said first and second substrates, said liquid crystal material having a first domain and a second domain, said first domain defined by a first pair of alignment directions and a first twist angle between said first pair of alignment directions, said second domain defined by a second pair of alignment directions and a second twist angle between said second pair of alignment directions, wherein said first domain is rotated from said second domain by approximately 180 degrees and wherein said first twist angle is different than said second twist angle, such that a first domain vertical viewing envelope and a second domain vertical viewing envelope are both shifted in a safe direction; and
    a first retarder and a second retarder, said first retarder approximate said first substrate and said second retarder approximate said second substrate, said first and second retarder configured to provide balanced compensation to improve the horizontal viewing envelope.

20. An LCD device according to claim 19 wherein said first twist angle is greater than 90 degrees and said second twist angle is less than 90 degrees.

21. An LCD device according to claim 19 wherein said first twist angle is greater than 105 degrees and said second twist angle is less than 75 degrees.

22. The LCD device according to claim 19 wherein said first pair of alignment directions is determined by a first rubbing direction having an orientation of −127.5 degrees relative to a reference direction and a second rubbing direction having an orientation 127.5 degrees relative to said reference direction, and wherein said second pair of alignment directions is determined by a third rubbing direction having an orientation of 37.5 degrees relative to said reference direction and a fourth rubbing direction having an orientation of −37.5 degrees relative to said reference direction.

23. The LCD device according to claim 19 wherein said liquid crystal material has a birefringence and a thickness, and wherein said first retarder and said second retarder each have a retardance within an approximate range of one-quarter to one-half of a produce of said liquid crystal material birefringence and said liquid crystal material thickness.

24. The LCD device according to claim 19 wherein each of said first and second retarders comprises a negative birefringence retarder with an optical plane perpendicular to the retarder.

25. A normally white twisted nematic liquid crystal (LCD) device, the LCD device having a vertical viewing envelope and a horizontal viewing envelope, the LCD device comprising:

a first polarizer;
    a second polarizer proximate said first polarizer;
    a first substrate located between said first polarizer and said second polarizer;
    a second substrate located between said first substrate and said second polarizer;
    first and second alignment means disposed on opposing surfaces of said first and second substrates;
    a liquid crystal material located between said first and second alignment means, said liquid crystal material including a first domain defined by a first pair of alignment directions associated with said fist and second alignment means and a second domain defined by a second pair of alignment directions associated with said first and second alignment means, said first domain having a first twist angle greater than 90 degrees and a corresponding first viewing envelope shifted in a first direction, said second domain being rotated approximately 180 degrees from said first domain and having a second twist angle less than 90 degrees, and said second domain having a corresponding second viewing envelope shifted in the first direction;
    a first retarder and second retarder, said first retarder located between said first polarizer and said first substrate, and said second retarder located between said second polarizer and said second substrate, said first and second retarder configured to provide substantially balanced compensation to improve the horizontal viewing envelope.

26. An LCD device according to claim 25 wherein said first twist angle is greater than 105 degrees and said second twist angle is less than 75 degrees.

27. The LCD device of claim 25, wherein:
    said first pair of alignment directions further comprises a first rubbing direction on said first alignment means having an orientation of −127.5 degrees relative to a reference direction and a second rubbing direction on said second alignment means having an orientation of 127.5 degrees relative to said reference direction;
    said second pair of alignment directions further comprises a third rubbing direction on said first alignment means having an orientation of 37.5 degrees relative to said reference direction and a fourth rubbing direction on said second alignment means having an orientation of −37.5 degrees relative to said reference direction;
    said liquid crystal material is characterized by a birefringence and a thickness; and
    said first retarder and said second retarder each have a retardance within the approximate range of one-quarter to one-half of the product of said birefringence and said thickness of said liquid crystal material.

28. The LCD device according to claim 25 wherein said liquid crystal material has a birefringence and a thickness, and wherein said first retarder and said second retarder each have a retardance within an approximate range of one-quarter to one-half of a produce of said liquid crystal material birefringence and said liquid crystal material thickness.

* * * * *